United States Patent [19]

Ortega-Aguirre et al.

[11] 4,251,710
[45] Feb. 17, 1981

[54] RESISTOR TYPE ARC WELDING MACHINE

[76] Inventors: David Ortega-Aguirre, Ave. de los 100 Metros No. 597; Carlos Michan-Verde, Paseo del Cantril No. 51, Casa 2, both of Mexico City, Mexico

[21] Appl. No.: 19,231

[22] Filed: Mar. 9, 1979

[51] Int. Cl.³ .............................................. B23K 9/10
[52] U.S. Cl. .................................. 219/130.1; 338/55; 338/231; 338/304
[58] Field of Search ................. 219/130.1; 338/53, 55, 338/231, 296, 304

[56] References Cited

U.S. PATENT DOCUMENTS

| | | | |
|---|---|---|---|
| 1,551,974 | 9/1925 | Brummett et al. | 338/55 |
| 1,608,321 | 11/1926 | Kassteen | 338/55 |
| 2,331,773 | 10/1943 | Graham | 338/231 |
| 3,177,338 | 4/1965 | Hoffmann | 219/130.1 |
| 3,278,721 | 10/1966 | Roe | 219/130.1 |
| 3,296,413 | 1/1967 | Steinert | 219/130.1 |
| 3,376,538 | 4/1968 | Gagnon | 338/231 |
| 3,459,919 | 8/1969 | Manz et al. | 219/130.1 |

FOREIGN PATENT DOCUMENTS 570761 5/1925 Fed. Rep. of Germany ........... 338/231

*Primary Examiner*—C. C. Shaw
*Attorney, Agent, or Firm*—Berman, Aisenberg & Platt

[57] ABSTRACT

A resistor type arc welding machine comprises a housing capable of containing a cooling liquid; first and second main resistors serially connected to each other, the free end of the first resistor being connected to the current line of an alternating current source and the free end of the second resistor being connected to a holder for a welding electrode; one or more taps from intermediate points along said first and second main resistors, which taps may be connected, preferably through respective by-pass resistors, to the said holder instead of the free end of said second main resistor, to provide higher amperage outlets; and a direct line whose first end is connected to ground and whose second end is connected to the work piece to be welded, in order to complete the electrical circuit and to produce the welding arc; the above mentioned main resistors being arranged in an open and perforate support fixed in said housing such that the resistors will be continuously and completely submerged in the cooling liquid during operation of the machine.

5 Claims, 4 Drawing Figures

RESISTOR TYPE ARC WELDING MACHINE

FIELD OF THE INVENTION

The present invention refers to arc welding machines and, more particularly, it is related to a resistor type arc welding machine which shows advantages as compared to the transformer type welding machines.

BACKGROUND OF THE INVENTION

Arc welding machines are very well known in the prior art and they usually comprise two different types of units, namely, motor-generator type welding machines and transformer type welding machines, both types having very well defined fields of application. The motor-generator type machines are normally utilized for producing very high amperage welding currents, such as 300 amps or more, which are useful when structural metal parts are to be welded to each other with a very high strength, or when a high penetration of the welding metal is required in the work piece. The transformer type machines, on the contrary, are normally utilized for producing electric welding currents of lower intensity, of the type useful in a blacksmith's shop or when the welding metal does not require a high penetration, whereby said types of machines have specific fields of application for which they have proven to be highly efficient.

Particularly referring to the transformer type prior art arc welding machines, which have been used with good efficiency in blacksmith's shop activities or in structures that do not require a high strength, said machines, while showing a performance and efficiency which is reasonably acceptable, present the serious drawback that, as they require a transformer for the single phase current to reduce the voltage and increase the amperage thereof, they also require large amounts of coil wire, as well as very bulky and heavy iron gaps to contain the primary and the secondary windings of the transformer, which produces a very heavey unit that must be mounted in a sufficiently strong housing to support such a weight. Also, this type of transformer type arc welding machine is required to contain within the housing supporting the transformer, a considerable volume of a cooling dielectric liquid, which renders the machine very costly and heavy and presents serious inconveniences for the transportation thereof, regardless of the fact that said machines are considered as portable machines, and are used very widely in blacksmith's shops.

Another serious inconvenience of the transformer type arc welding machine is that, as the cooling dielectric liquid is relatively costly, it is always necessary to load the machine, that is, the receptacle thereof, with a suitable volume of said liquid, which increases initial cost and also considerably increases the dead weight of the machine, that must be necessarily transported from one place to the other with the liquid within the same, inasmuch as said liquid is not easily available and must be acquired in specialized places.

Therefore, it has long been desired to design an arc welding machine that, is highly efficient for use in blacksmith's shops and also for producing welding cords of the same type produced by the transformer type welding machines, but will not have the serious drawbacks and the cumbersome inconveniences of the latter, and have a light-weight and an easy handling property that was not possible with the prior art transformer type arc welding machines.

BRIEF SUMMARY OF THE INVENTION

Having in mind the defects of the prior art transformer type arc welding machines, it is an object of the present invention to provide a resistor type arc welding machine which will be of a very simple and economical construction and of a very light weight, and will not require dielectric liquids for cooling thereof.

It is another object of the present invention to provide a resistor type arc welding machine of the above mentioned character, that will be capable of producing an output of high amperage and low voltage, suitable for producing the electric weld by means of the use of an electrode and a flux.

Still another object of the present invention is to provide a resistor type arc welding machine of the above mentioned character, that may be transported without the cooling liquid and may be loaded therewith at the site of operation, said liquid being preferably water.

It is still a more particular object of the present invention to provide a resistor type arc welding machine that will be capable of reducing the voltage fed thereto by means of a plurality of resistors serially connected between the current inlet and the welding electrode holder.

The foregoing objects and others ancillary thereto are preferably accomplished as follows:

According to a preferred embodiment of the present invention, an arc welding machine comprises particularly a light weight housing capable of containing a non-dieletric cooling liquid, such as water, at a suitable level. Within said housing a pair of serially connected main resistors are mounted, the free end of the first main resistor being connected to the current inlet line from a single phase alternating current source and the free end of the second resistor being connected to the welding electrode holder. A third or by-pass resistor is connected to the intermediate point between the two main resistors and its free end may be connected to the above mentioned holder in lieu of the free end of the second main resistor, to thereby provide two outlets, namely, a first outlet through the free end of the second main resistor and a second outlet through the by-pass resistor, so that at the free end of the by-pass resistor a higher current intensity may be drained as compared to that which may be drained from the free end of said second main resistor, and a further by-pass connected to an intermediate tap along the length of the second main resistor, which free end may be connected to the said holder to provide still other different current intensity, whereby the machine of the present invention will be provided with a high versatility. The ground line from the alternating current source is directly connected to the outlet of the machine for connection with the work piece which is to be welded, in order to complete the electrical circuit and to produce the arc. All the above mentioned main resistors are arranged in an open and perforate support, fixed in the housing and such that the resistors will be continuously and completely submerged in the cooling liquid during operation of the machine, in order to avoid undue increase in the temperature and to enable the outlets to permit drainage of high intensity and low voltage currents as is necessary for the production of a suitable arc for depositing a welding metal from an electrode lined with a flux and supported by the holder.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment, when read in connection with the accompanying drawings, in which:

DETAILED DESCRIPTION

Figure 1:
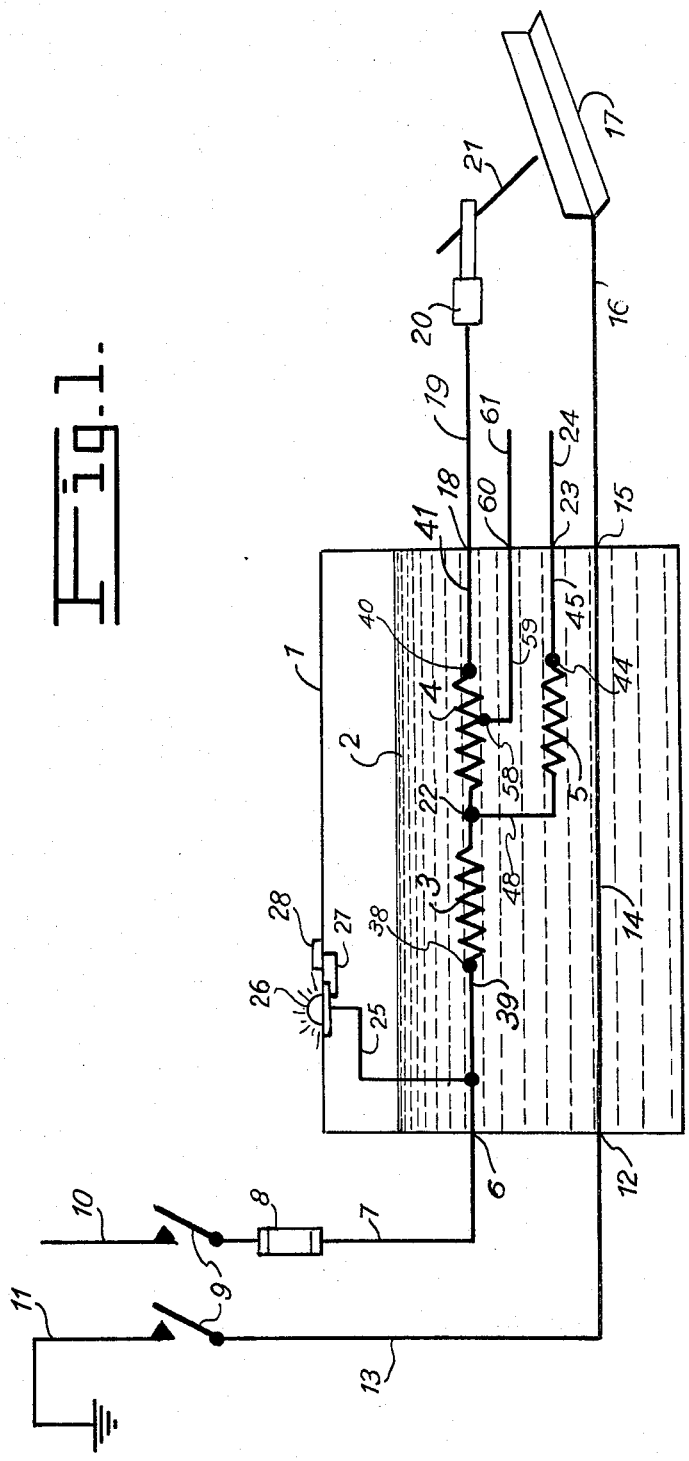
FIG. 1 is a schematic circuit diagram of the resistor type arc welding machine built in accordance with the present invention, showing the interrelationship of its constituent parts with an alternating current line and with the work piece.

Having now more particular reference to the drawings and still more particularly to FIG. 1 thereof, a resistor type arc welding machine built in accordance with the present invention is illustrated as comprising essentialy a housing 1 of any suitable shape, of impermeable nature and adapted to contain therewithin a volume of a cooling liquid 2, which may be a dielectric cooling oil but which is preferably water, and within which a pair of main resistors 3 and 4 are mounted, said resistors being serially connected to each other, with the free end of resistor 3 being connected by means of a suitable lead 39 to a suitable terminal post 6 fixed at one side of housing 1, whereas the free end of resistor 4 is connected, for example, by means of a suitable lead 41, to a terminal post 18 fixed at the opposite side of housing 1, such as may be seen in FIG. 1 of the drawings. A smaller third or by-pass resistor 5 is connected to a connector 22 between the two resistors 3 and 4 and said by-pass resistor 5 is in turn connected, for example, through a lead 45, to an additional terminal post 23 fixed in the housing 1, at the same panel where the terminal post 18 of the main resistor 4 is fixed, for a purpose which will be more clearly apparent in what follows.

One or more by-passing taps, such as 58, may be provided in any one of resistors 3 or 4, but in accordance with the preferred embodiment of the invention, only one by-passing tap 58 is provided at a point intermediate the length of resistor 4, which tap is connected by means of lead 59 to an additional terminal post 60 for a purpose which will be clearly apparent in what follows.

Within housing 1 of the arc welding machine built in accordance with the present invention, a pair of terminal posts 12 and 15 connected to ground are fixed to said housing 1 at opposite ends thereof, such that the terminal post 12 will be in the same panel as the terminal post 6 which is the current inlet terminal, whereas terminal post 15 will be placed in the same panel as the terminal posts 18, 23 and 60 that provide a plurality of the current outlets, both terminal posts 12 and 15 being connected to each other by means of a direct completely insulated line 14, to transmit directly the ground connection of the machine from one end to the other thereof.

The terminal posts 6 and 12 are respectively connected, through leads 7 and 13, for example, to a single phase alternating current source, such that terminal post 6 will be connected to the current line 10 whereas terminal post 12 will be connected to the ground line 11 of the alternating current source. A main switch such as illustrated at 9 in FIG. 1 of the drawings may be incorporated in said line in order to connect or disconnect at will the welding machine to the alternating current source 10, 11. Also, one or more fuses 8, of suitable values, may be included to protect the machine against short circuits.

The fuses 8 may be interposed in both current and ground lines 7 and 13 but, in accordance with the illustrative embodiment of the present invention, it is preferred to place the fuse 8 within the current line 10, before the current reaches resistor 3 of the test light of the machine to be described hereinbelow.

Any one of the terminal posts 18, 23 and 60 which drain current from the main resistors 3 and 4 is connected, for example, by means of a suitable lead 19, to the holder 20 for the electrode 21 for carrying out the arc welding operation, whereas the ground terminal post 15 is connected by means of a lead 16, for example, either directly or through a press such as is conventional in the art, to the work piece 17, such that when the electrode 21 contacts the work piece 17, the current circuit is closed to produce the desired arc.

The by-passing resistor 5 produces, by virtue of being an intermediate by-pass, a higher current intensity and, therefore, when a higher penetration of the weld metal from electrode 21 is necessary, then the electrode holder 20 is connected to the terminal post 23 of the welding machine in accordance with the present invention, by means of cable 24, such that a larger current drainage is obtained. Also, the by-passing tap 58 connected to terminal post 60, will produce an intermediate current drainage which value will be between that of the terminal post 18 and that of the terminal post 23, which will provide the machine built in accordance with the present invention with a high versitility.

While resistors 3, 4 and 5 may have many different values of resistance to produce the desired currents and voltage drops, it is preferred to calculate the resistors 3, 5 and the resistors 3, 4 connected in respective series, such that a current drainage will be produced of approximately 50 amperes at the terminal post 18, of approximately 65 amperes at the terminal post 60 and of approximately 100 amperes at the terminal post 23, in order to provide the machine of the present invention with three current drainages to weld different types of work pieces, depending on the structure and the penetration desired of the welding metal, all of said amperages derived from a 115 volts, single phase a.c. source.

The resistor type arc welding machine in accordance with the present invention is conveniently provided with a glow light high resistance unit 26, connected through a lead 25 to the current terminal post 6, whereas the other end of the difuse light unit 26 is connected through a small lead 27 to a conducting plate or test button 28 which is exposed on the upper surface of housing 1, such that an element will be provided to ascertain at any moment when the current is connected to the machine, by the simple action of placing a finger of the user on the test button 28, in order to close a high resistance circuit that will light unit 26, thereby indicating that the current is duly connected to the machine.

Figure 2:
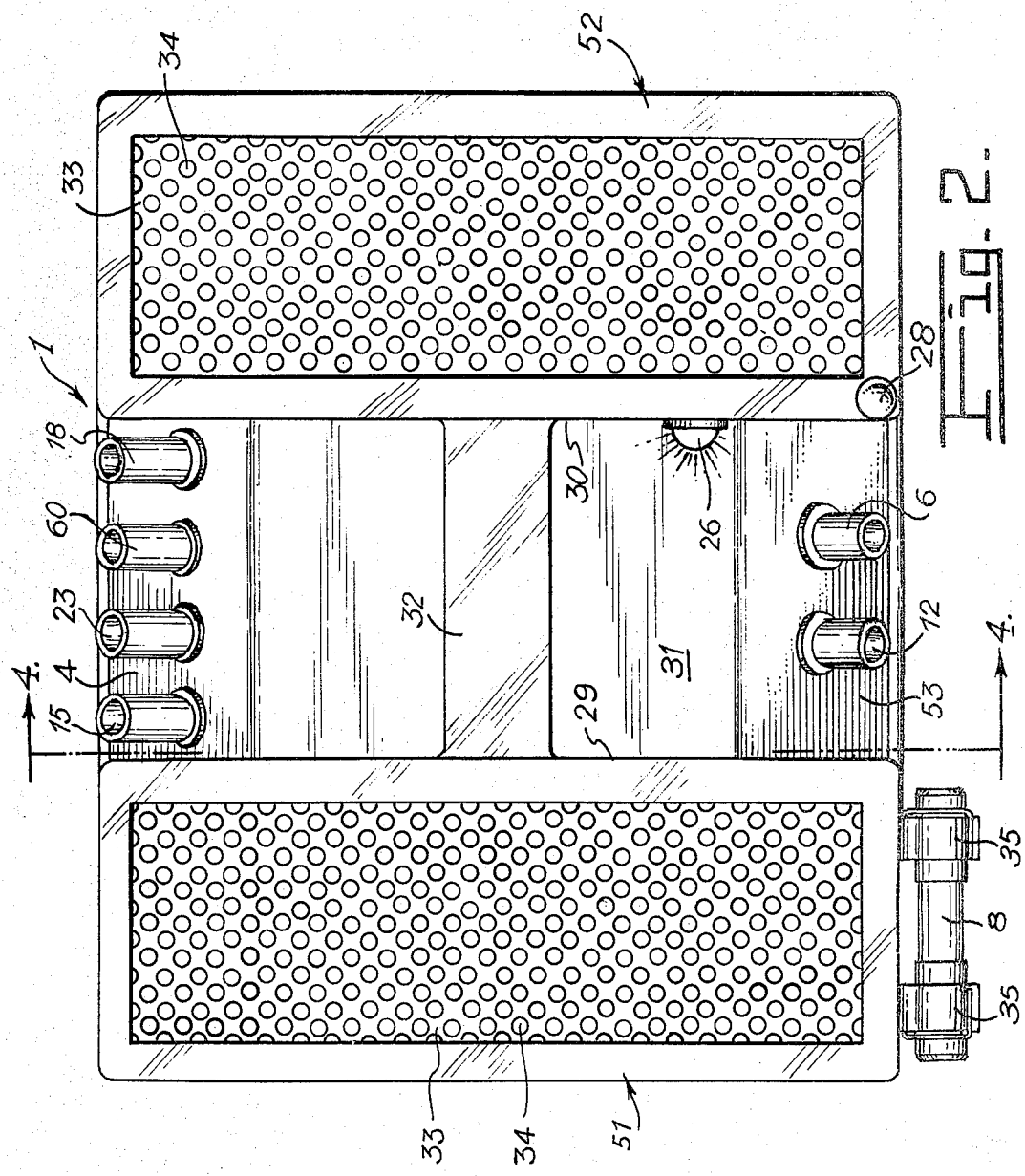
FIG. 2 is a top plan view of the resistor type arc welding machine built in accordance with the present invention.
Figure 3:
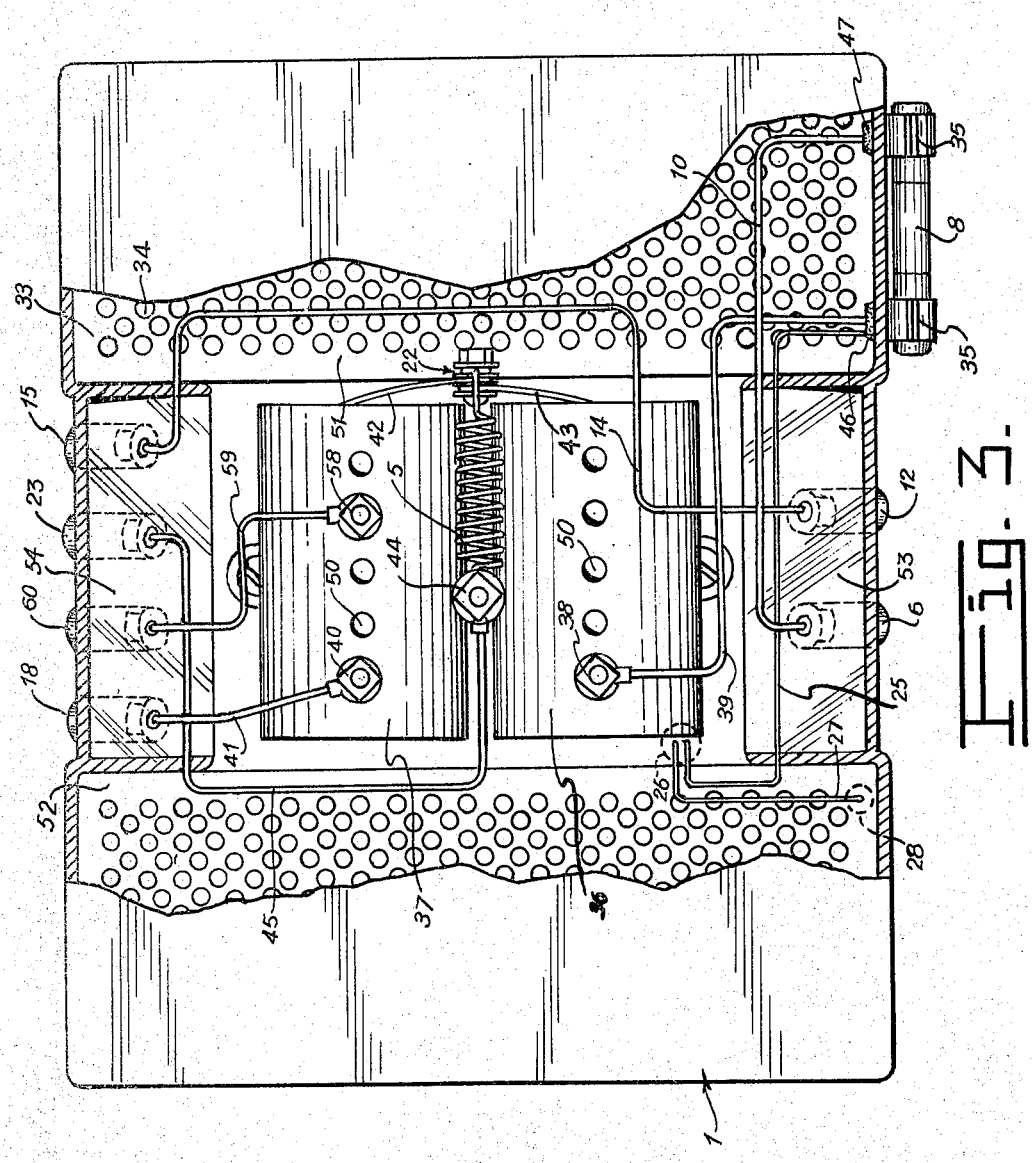
FIG. 3 is a cross-sectional bottom plan view, partially removed to show inner details, showing the arrangement of the resistors and their interconnections within the housing of the machine.
Figure 4:
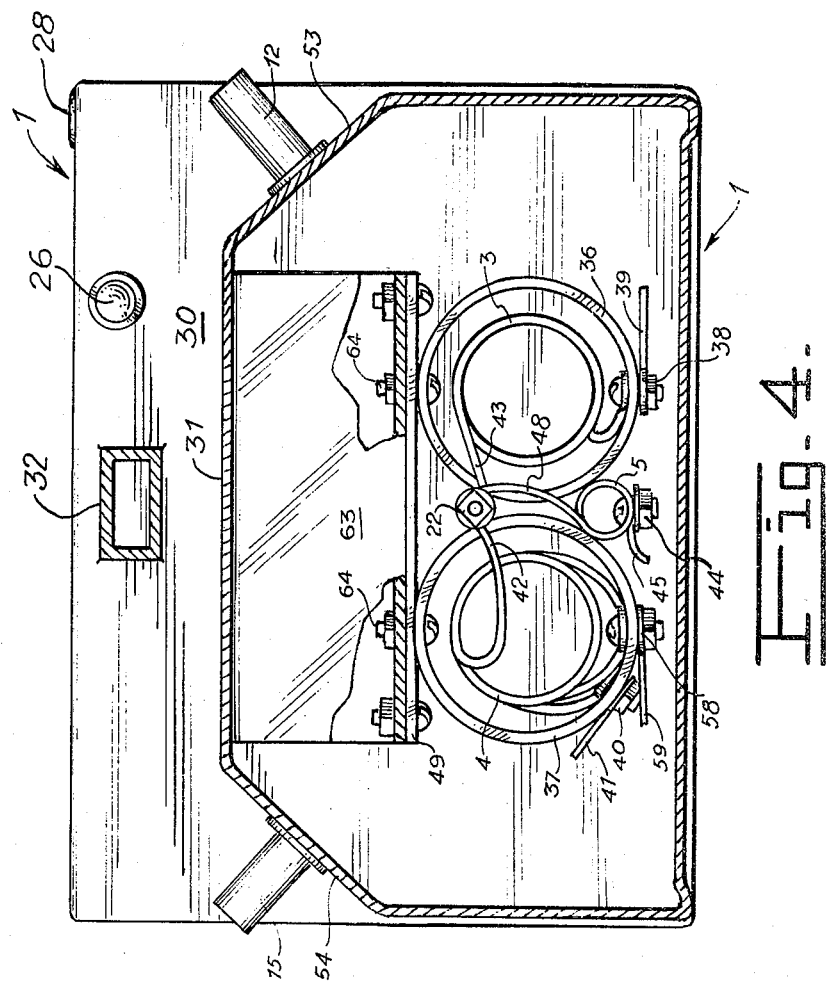
FIG. 4 is a cross-sectional elevational view taken along lines 4—4 of FIG. 2 and looking in the direction of the arrows.

In FIGS. 2 to 4 of the drawings, a resistor type arc welding machine built in accordance with the basic principles described above and clearly illustrated in FIG. 1 of the drawings is shown, and for clarity purposes, in all the said figures the same reference characters will be used to indicate like parts wherever this is possible. In accordance with the preferred embodiment of the present invention, housing 1 is a molded housing of a preferably insulating material, having an approximately rectangular shape and having a top shaped such that it will constitute two end elevated portions 51 and 52 and a shallow portion or recess 31 between the inner panels 29 and 30 and in which an integral projection 32 is provided to serve as a handle for easily transporting the machine, as more clearly illustrated in FIG. 2 of the drawings. At each one of the elevated portions 51 and 52 of the top of housing 1, a perforate plate 33 is arranged. Said perforate plate 33 has a plurality of holes or openings 34, through which the escape of vapors produced by the cooling liquid is permitted, particularly water 2, and that also allow loading the machine with the liquid 2 up to a suitable level into the insulating housing 1.

At each one of the side walls of housing 1, respective inwardly and upwardly inclined panels are provided, such as clearly illustrated by the reference characters 53 and 54, wherein the inlet and outlet terminal posts of the welding machine of the present invention are arranged.

It is preferred to locate the test light 26 on the panel 30 and the test button 28 at the top of the elevated portion indicated under reference number 52.

The fuse 8 illustrated in FIG. 1 of the drawings, is normally supported by means of the press 35, fixed on the upper part of the side wall of housing 1 which corresponds to the inlet terminal post of the machine of the present invention, in accordance with what is clearly illustrated in FIGS. 2 and 3 of the drawings.

As it can also be clearly seen in FIGS. 3 and 4 of the accompanying drawings, the main resistors 3 and 4 are of a coiled shape and are respectively housed within insulating cylinders 36 and 37 having a plurality of holes 50 to allow free passage of the cooling liquid inwardly and outwardly of cylinders 36 and 37. The insulating cylinders 36 and 37 are supported from a channel 63 integral with housing 1, by means of an insulating coupling plate 49 and screw 64, as more clearly illustrated in FIG. 4. Resistor 3 is connected within cylinder 36 to an inlet connector 38 and its opposite tail 43 is connected to a connector 22, whereas resistor 4 which is arranged within cylinder 37 is connected to an outlet connector 40 and its tail 52 is connected to the same connector 22, such that both resistors 3 and 4 will be serially connected to each other and to the current line in accordance with what will be described in more detail hereinbelow. The by-pass resistor 5 is also of a helical coiled shape and has a smaller diameter than resistors 3 and 4. Said by-pass resistor is arranged outside of cylinders 36 and 37, with one of its ends connected also to the connector 22 whereas the opposite end thereof is connected to an outlet connector 44. The resistor 4 is connected, at an intermediate point thereof (FIG. 4) to an outlet connector 58 which engages a point in an intermediate turn of the coil and provides an intermediate current tap.

At the current inlet end of housing 1, as more clearly illustrated in FIGS. 3 and 4 of the drawings, the terminal posts 6 and 12 are arranged, with the terminal post 6 connected through a lead 10, in accordance with what was described above, to fuse 8 through the connector 47, whereas the opposite connector 46 of fuse 8 is connected to the current supply wire 39 which is in turn connected to the connector 38 to supply current to resistor 3. At the opposite end of housing 1, four terminal posts 15, 18, 23 and 60 are arranged, with terminal post 15 connected to lead 14 which directly connects the same with the ground line inlet terminal post 12, the line 14 being suitably insulated to avoid electrolysis and short circuiting and preferably being always above the level of the water contained within the receptable formed by housing 1. The terminal post 18, in turn, is connected through lead 41 to the outlet connector 40 which drains the current from the main resistor 4, to produce a low amperage current outlet in the machine of the present invention. Terminal post 23 is in turn connected, through the drainage lead 45, to the outlet connector 44 which drains current from the by-pass resistor 5 in order to produce a current outlet of higher intensity in the machine. Finally, the terminal post 60 is connected, through lead 59, to the drainage connector 58 at an intermediate position of resistor 4, in order to produce a current outlet of intermediate intensity in the machine.

The lead 25 which connects the glow light unit 26 with the current terminal post, may be connected, as more clearly seen in FIG. 3 of the drawings, to the connector 46 of fuse 8, jointly with the current supply wire 39, all of these leads and wires being suitably insulated to avoid contact with the water which is within the device of the present invention.

The performance of resistors 3, 4 serially connected or of the resistors 3, 5 serially connected, depending on the terminal post 18, 60 or 23 which is connected to the holder 20 of the welding electrode 21, is that of reducing the voltage which is applied to electrode 21, such that the voltage drop between said electrode and the work piece 17 directly connected to the ground terminal post 15, will be sufficiently low and yet may drain a high current intensity, in order to produce a suitable electrical welding cord which will have a good penetration and strength. In operation, obviously, resistors 3, 4 or 3, 5 will increase their temperature when the circuit is closed, by virtue of being subjected to a voltage and, consequently, this will also raise the temperature of the water contained within the receptable provided by the housing 1. Therefore, it is possible to obtain a working cycle with the machine of the present invention, which has been experimentally determined to be of about 2 minutes of continuous welding followed by two minutes of rest, in order to avoid undue increase in the temperature of the water that could be sufficient to cause boiling thereof. In the case of dot welding, the machine of the present invention may be capable of continuously working during 15 minutes of dot welding, followed by 5 minutes of rest. In any event it is necessary most of the times to change the water after approximately one hour of continuous work, in order to avoid undue increase in the temperature thereof. However, as the cooling liquid used is tap water, the above provides the advantage that such liquid is available in any working place and, therefore, this change of liquid will not cause any serious problem for providing continuous working. Nevertheless, it is also possible, if desired, to use a dielectric cooling liquid having a high boiling point, such as the well known transformer oils, but the utilization of this type of liquid, of course, would cancel one of the advantages of the present invention, namely, the capability of the machine of the present invention to be carried in an empty state and, therefore, with a very low weight, to thereafter be loaded with the cooling liquid at the site of operation.

Inasmuch as in general terms the voltage drop through the arc formed between the electrode 21 and the work piece 17 is of about from 25 to 30 volts, resistors 3, 4 and 5 are calculated to provide a voltage drop within the device, of approximately from 75 to 85 volts, in order to produce a voltage between the ground terminal post 15 and any one of the current terminal posts 18, 23 and 60, that will not exceed the potential drop of the welding arc.

It may be seen from the above that a resistor type arc welding machine has been provided for the first time, which is of very adventageous characteristics as compared to the transformer or induction type machines, since firstly it is of a very low weight, secondly it may utilize tap water as cooling liquid without any electrolysis or high voltage problems, thirdly in view of not producing any induction impedance, it will not consume current at open circuit and, finally, it produces a high intensity and low voltage current drainage for the formation of electric welding cords by means of a suitable electrode.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. A resistor type arc welding machine comprising, in combination:
   (a) a housing capable of containing water at a suitable level;
   (b) a pair of serially connected main resistors, the free end of the first main resistor being provided with a connector for supplying current thereto from a single-phase alternating current source, and the free end of the second main resistor being provided with a connector for receiving the connecting cable of a welding electrode holder;
   (c) a perforate hollow support for housing said main resistors and comprising first and second insulating cylinders arranged in a side-by-side relationship, the first main resistor being housed within said first cylinder and the second main resistor being housed in said second cylinder, the walls of said cylinders being provided with a plurality of holes and and both ends of each of said cylinders being open to permit an efficient flow of cooling water past said main resistors;
   (d) at least one by-pass resistor connected to the point intermediate said two main resistors, the free end of said by-pass resistor being provided with a connector to receive the connecting cable of a welding electrode holder, the value of said at least one by-pass resistor being selected such that a predetermined current drain is obtained at said connector provided at the free end thereof;
   (e) at least one by-pass tap at an intermediate point along the length of said second main resistor, the position of said point being selected to provide a predetermined current drain from said second main resistor; and
   (f) a lead, the first end of which is provided with a connector for receiving a ground connection from said alternating current source, and the second end of which is provided with a connector for receiving a cable connecting the work piece thereto;
the level of said water in said housing being such as to completely submerge said perforate support and resistors in order to produce a convection stream to thereby efficiently cool said resistors.

2. A resistor type arc welding machine according to claim 1 which includes a glow light test unit connected to the current line of said single phase alternating current source at one of its ends, whereas the other end of said test light unit is connected to test button means arranged on the top of said housing for ascertaining when said current source is connected to the machine by closing a high resistance ground circuit to light said difuse light unit.

3. A resistor type arc welding machine according to claim 1, wherein said housing comprises a pair of inwardly and upwardly inclined panels arranged one at each side of the housing, said connectors being provided in the form of terminal posts on said inclined panels for connecting said resistors and ground, the top of said housing containing a plurality of openings to permit the exhaust of the vapors generated by the cooling water and also to permit the pouring of said water into and out of the housing.

4. A resistor type arc welding machine according to claim 3 wherein said housing is formed such that it will comprise a central crosswise recess, a handle extending throughout the width of said recess integrally to said housing, in order to provide a grip for transportation of the machine.

5. A resistor type arc welding machine according to claim 1 wherein said first and second insulating cylinders are horizontally arranged one beside the other and said holes in said cylinders are arranged in a longitudinally extending linear array at the lowermost point of each said cylinder, so as to provide for the convection-induced injection of streams of water past the said main resistors and the ejection of heated liquid through the open ends of said cylinders.

* * * * *